United States Patent

[11] 3,614,735

[72] Inventors Roy Harold Mauger; John Michael Frampton, both of Liverpool, England

[21] Appl. No. 866,837
[22] Filed Oct. 16, 1969
[45] Patented Oct. 19, 1971
[73] Assignee The Plessey Company Limited Ilford, England
[32] Priority Oct. 21, 1968
[33] Great Britain
[31] 49832

[54] MONITORING CIRCUITS
4 Claims, 3 Drawing Figs.

Figure 1:
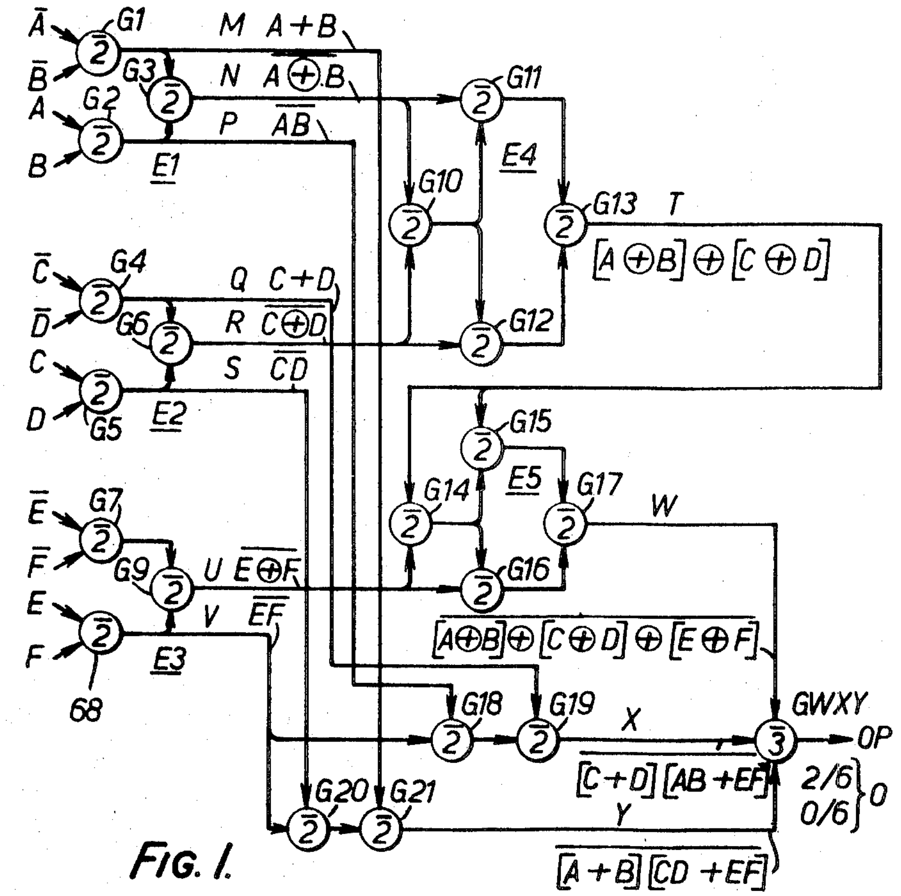

[52] U.S. Cl. .......... 340/146.1
[51] Int. Cl. .......... G06f 11/00
[50] Field of Search .......... 235/153; 340/146.1; 307/215, 216

[56] References Cited
UNITED STATES PATENTS

| | | | |
|---|---|---|---|
| 2,958,072 | 10/1960 | Batley | 340/146.1 X |
| 3,245,049 | 4/1966 | Sakalay | 340/146.1 X |
| 3,407,357 | 10/1968 | Spándorfer et al. | 307/216 X |
| 3,446,990 | 5/1969 | Goldberg | 307/216 X |

*Primary Examiner*—Charles E. Atkinson
*Attorney*—Blum, Moscovitz, Friedman & Kaplan ABSTRACT: The preferred circuit uses NAND gates or NOR gates in integrated circuit form and is employed for monitoring the "set" and "reset" sides of six storage toggles A to F to determine the validity or otherwise of their coded outputs. The circuit comprises three branches appropriate to the terms:

$(A \oplus B) \oplus (C \oplus D) \oplus (E \ominus F)$ . . . 1/6, 3/6, 5/6
$(C+D)(AB+EF)$ . . . 3 of 4/6
$(A+B)(CD+EF)$ These branches are arranged to ensure that the only valid conditions are 2-out-of-6 and the null condition 0-out-of-6.

MONITORING CIRCUITS

The present invention relates to monitoring circuits for checking the validity or otherwise of the collective states of storage toggles or the like which are nominally responsive to information in so-called 2-out-of 6 form.

An object of the invention is to provide a monitoring circuit which uses simple electronic gates which are readily available in form of integrated circuit packages and in which the number of such gates employed is minimal or approaches the minimal.

According to the invention there is provided a monitoring circuit operative according to the collective state of six storage toggles or the like each capable of assuming a first condition and a second condition and arranged in first, second and third mutually exclusive pairs first, second and third Exclusive-OR devices are provided which are each controlled by said first, second and third pairs of toggles, respectively, to produce a particular signal at its output lead only when either of the related toggles is in the first condition fourth and fifth Exclusive-OR devices having two input leads are provided, said fourth device being controlled by outputs of said first and second devices and the fifth device being controlled from the outputs of said third and fourth devices. The fifth device is arranged to produce a signal of one form at its output lead if an odd number of storage toggles are in said first condition and to produce a signal of the alternative form for all other combinations of conditions of the toggles first and second circuit means having individual output leads are also provided and are separately controlled by all the toggles in such manner that of all said other combinations of conditions only those having solely two of said toggles or none of them in said first condition are effective to produce a signal corresponding to said alternative form at both the latter output leads.

The output lead of the fifth Exclusive-OR device and the output lead of said first and second circuit means may extend to inputs of output gating means which is operative to generate a significant signal when any two of said toggles or none of them are in said first condition.

The monitoring circuit excluding the output gating means may comprise 2-input NAND gates exclusively or in another embodiment of the invention the monitoring circuit excluding the output gating means may comprise 2-input NOR gates exclusively.

Figure 2:
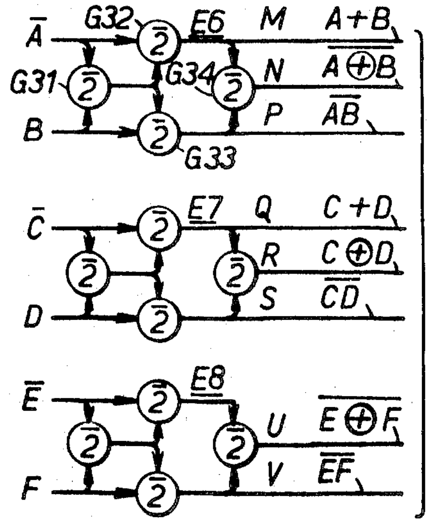
Figure 3:
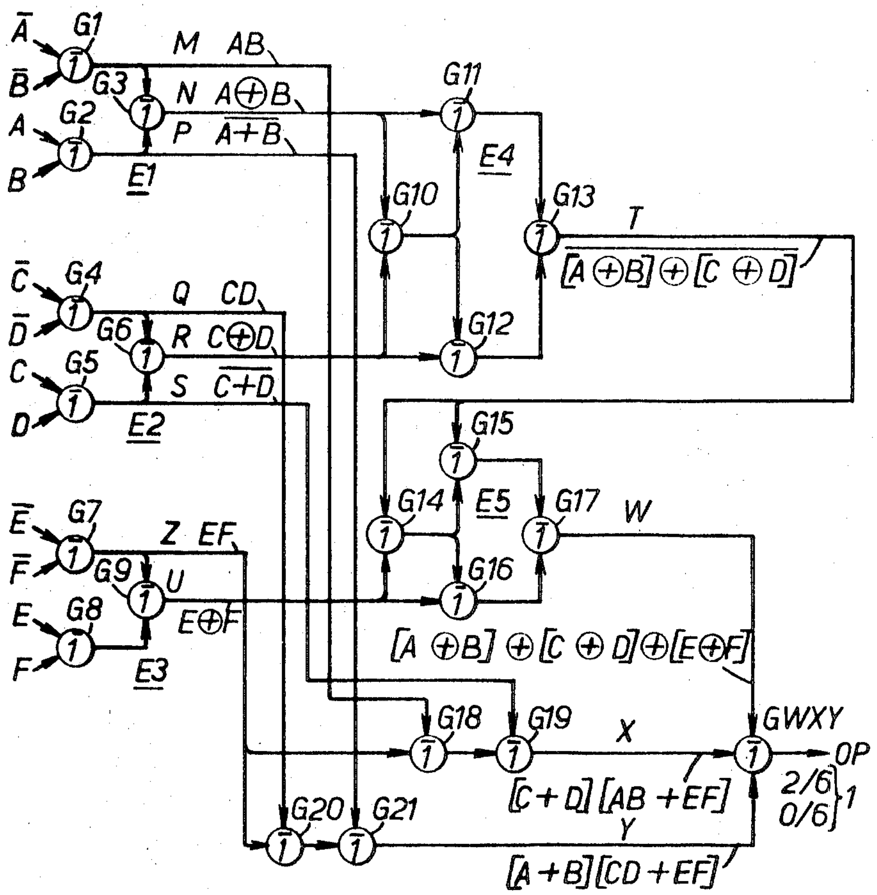

The invention will be better understood from the following description of exemplary methods of carrying it into effect which should be read in conjunction with the accompanying drawings in which FIG. 1 shows a "2-out-of-6" monitoring circuit using NAND gates;

FIG. 2 shows circuit arrangements, also using NAND gates, for use in place of certain portions of FIG. 1 to enable the same monitoring function to be performed with fewer input leads; and, FIG. 3 shows a monitoring circuit corresponding with FIG. 1 but using NOR gates exclusively.

The monitoring circuit illustrated in FIG. 1 is concerned with determining the validity or otherwise of the states of six storage toggles or the like, namely TA, TB, TC, TD, TE and TF (not shown), and it is to be noted that a valid state, of which there are 15, obtains when any two toggles are in the set condition and the remainder are reset. In addition the "idle" state of all the toggles, obtaining when all are in the reset condition (i.e. the 0/6 state) is also to be interpreted as valid. All the remaining possible 48 states of the six toggles, making a total of 64, are to be interpreted as invalid, and these involve six one-sixth states, 20 three-sixth states, 15 four-sixths states, 6 five-sixths states and the 1 six-sixths state.

In the circuit, as in FIG. 2, NAND gates are used throughout. In each case the numeral within the circle is indicative of the number of concurrent inputs which are required to satisfy the gate and a bar over the numeral is indicative of the inverting function of the gate. When all inputs of any gate are in the "1" state the output becomes "0," but otherwise the output is "1."

The monitoring circuit incorporates three, Exclusive-OR devices, E1, E2, and E3, of one configuration and two Exclusive-OR devices E4 and E5 of another configuration. All of these devices comprise 2-input NAND gates, the first three devices each embodying three such gates G1, G2 and G3; G4, G5 and G6; and G7, G8 and G9 respectively whereas the devices E4 and E5 each embody four such gates G10, G11, G12 and G13; and G14, G15, G16 and G17 respectively.

Each of Exclusive-OR devices E1, E2 and E3 is concerned with the outputs of a particular pair of the six storage toggles. Thus device E1 is associated with the outputs of toggles TA and TB of which the set side output leads, extending to gate G2, are designated A and B respectively whereas the reset side output leads extending to gate G1 are designated $\overline{A}$ and $\overline{B}$ respectively. Using the conventional "1" and "d" legends to signify the outputs relevant to the active and quiescent states respectively of either side of these toggles, the four possible combinations of toggle-output conditions involving leads A, $\overline{A}$, B and $\overline{B}$ can be seen from the following:

| | A | $\overline{A}$ | B | $\overline{B}$ |
|---|---|---|---|---|
| 1. TA set TB reset | 1 | 0 | 0 | 1 |
| 2. TA reset TB set | 0 | 1 | 1 | 0 |
| 3. TA set TB set | 1 | 0 | 1 | 0 |
| 4. TA reset TB reset | 0 | 1 | 0 | 1 |

When combination 1 or 2 is evident, "1" is obtained at the outputs M and P of gates G1 and G2 as a result "0" is produced at the output lead N of gate G3. On the other hand when combination 3 is evident "1" and "0" are produced at the outputs of gates G1 and G2 respectively, whereas when combination 4 is evident "0" and "1" outputs are produced by gates G1 and G2 respectively, and accordingly in both instances a "1" condition results at the output N of gate G3. The significance of output lead N of the Exclusive-OR device E1 is conveniently expressed by the term $\overline{A \oplus B}$ (where $\oplus$ signifies Exclusive-OR and is to be interpreted that only when combination 1 or 2 above applies (i.e. inputs different) the output is "0." Useful byproducts of the particular Exclusive-OR circuit are derived from gates G1 and G2 and these are expressed in the terms A+B and $\overline{AB}$ at leads M and P respectively; A+B inferring that only with toggle TA and/or toggle TB set is "1" obtained at lead M and $\overline{AB}$ inferring that only with toggles TA and TB both set is "0"0at lead P.

All the foregoing remarks appertaining to toggles TA and TB and the associated Exclusive-OR device E1 are equally applicable to the pair of toggles TC and TD and its Exclusive-OR device E2 so that the significance of the output lead R is expressed by the inverted output $\overline{C \oplus D}$ which infers that only with toggle TC or TD exclusively set is the output "0" evident at lead R. Also the externally usable byproducts C+D and $\overline{CD}$ are obtainable at leads Q and S.

Likewise the output lead U of the Exclusive-OR device E3 serving toggles TE and TF has the significance $\overline{E \oplus F}$, (toggle TE or TF exclusively set gives "0" output) but only one byproduct, namely $\overline{EF}$ at lead V is made available for external use.

Output leads N and R of the Exclusive-OR devices E1 and E2 are connected to individual inputs of an Exclusive-OR device E4 of the second type.

Arising from the various states that toggles TA, TB, TC and TD may assume, either of four input combinations may be applied to the Exclusive-OR device E4, and the effect of each of these can be seen from table 1 below:

TABLE 1

| Toggle(s) | Inputs N | Inputs R | Gate G10 | Gate G11 | Gate G12 | Gate G13[1] |
|---|---|---|---|---|---|---|
| (1) TA<br>(2) TB<br>(3) TA TC TD<br>(4) TB TC TD | 0 | 1 | 1 | 1 | 0 | 1 |
| (5) TC<br>(6) TD<br>(7) TA TB TC<br>(8) TA TB TD | 1 | 0 | 1 | 0 | 1 | 1 |
| (9) None<br>(10) TA TB<br>(11) TC TD<br>(12) TA TB TC TD | 1 | 1 | 0 | 1 | 1 | 0 |
| (13) TA TC<br>(14) TA TD<br>(15) TB TC<br>(16) TB TD | 0 | 0 | 1 | 1 | 1 | 0 |

[1] Output.

Thus as a result of connecting leads N and R to the Exclusive-OR device E4, "1" is obtained at the output lead T in examples 1 to 8 whereas in the remaining cases the output "0" is obtained. The significance of lead T is conveniently designated $[A\oplus B]\oplus[C\oplus D]$.

The output lead U (having the significance $E\oplus F$) of the Exclusive-OR device E3, associated with toggles E and F, is taken to one input of the further Exclusive-OR device E5 and the above-mentioned lead T is taken to the other input of the latter device.

Exclusive-OR device E5 functions in identical manner with device E4 in that when the two inputs (at leads T and U) are different, "1" is produced at the output lead W, whereas, when the inputs are identical, the "0" condition is produced at the output. Table 2 below summarizes the various combinations of states of toggles TA, TB, TC, TD, TE and TF with respect to the resultant markings of input leads T and U of the Exclusive-OR device E5. In some instances, for ease of understanding, the symbol $\overline{TA}$, $\overline{TB}$, $\overline{TC}$, $\overline{TD}$, $\overline{TE}$ or $\overline{TF}$ is tabulated, and from this it is to be inferred that the particular toggle is reset as is also the case for the combinations where the toggle designation is omitted.

TABLE 2

| Toggle(s) set | | | | | | | Inputs T | Inputs U | Toggle(s) set | | | | | | | Inputs T | Inputs U |
|---|---|---|---|---|---|---|---|---|---|---|---|---|---|---|---|---|---|
| (1) | TA | | | | TE | | 1 | 0 | (33) | TA | | | | TE | TF | 1 | 1 |
| (2) | | TB | | | TE | | 1 | 0 | (34) | | TB | | | TE | TF | 1 | 1 |
| (3) | | | TC | | TE | | 1 | 0 | (35) | | | TC | | TE | TF | 1 | 1 |
| (4) | | | | TD | TE | | 1 | 0 | (36) | | | | TD | TE | TF | 1 | 1 |
| (5) | TA | TB | TC | | TE | | 1 | 0 | (37) | TA | TB | TC | | TE | TF | 1 | 1 |
| (6) | TA | TB | | TD | TE | | 1 | 0 | (38) | TA | TB | | TD | TE | TF | 1 | 1 |
| (7) | TA | | TC | TD | TE | | 1 | 0 | (39) | TA | | TC | TD | TE | TF | 1 | 1 |
| (8) | | TB | TC | TD | TE | | 1 | 0 | (40) | | TB | TC | TD | TE | TF | 1 | 1 |
| (9) | TA | | | | | TF | 1 | 0 | (41) | TA | | | | $\overline{TE}$ | $\overline{TF}$ | 1 | 1 |
| (10) | | TB | | | | TF | 1 | 0 | (42) | | TB | | | $\overline{TE}$ | $\overline{TF}$ | 1 | 1 |
| (11) | | | TC | | | TF | 1 | 0 | (43) | | | TC | | $\overline{TE}$ | $\overline{TF}$ | 1 | 1 |
| (12) | | | | TD | | TF | 1 | 0 | (44) | | | | TD | $\overline{TE}$ | $\overline{TF}$ | 1 | 1 |
| (13) | TA | TB | TC | | | TF | 1 | 0 | (45) | TA | TB | TC | | $\overline{TE}$ | $\overline{TF}$ | 1 | 1 |
| (14) | TA | TB | | TD | | TF | 1 | 0 | (46) | TA | TB | | TD | $\overline{TE}$ | $\overline{TF}$ | 1 | 1 |
| (15) | TA | | TC | TD | | TF | 1 | 0 | (47) | TA | | TC | TD | $\overline{TE}$ | $\overline{TF}$ | 1 | 1 |
| (16) | | TB | TC | TD | | TF | 1 | 0 | (48) | | TB | TC | TD | $\overline{TE}$ | $\overline{TF}$ | 1 | 1 |
| (17) | $\overline{TA}$ | $\overline{TB}$ | $\overline{TC}$ | $\overline{TD}$ | TE | TF | 0 | 1 | (49) | $\overline{TA}$ | $\overline{TB}$ | $\overline{TC}$ | $\overline{TD}$ | TE | | 0 | 0 |
| (18) | TA | TB | | | TE | TF | 0 | 1 | (50) | TA | TB | | | TE | | 0 | 0 |
| (19) | TA | | TC | | TE | TF | 0 | 1 | (51) | TA | | TC | | TE | | 0 | 0 |
| (20) | TA | | | TD | TE | TF | 0 | 1 | (52) | TA | | | TD | TE | | 0 | 0 |
| (21) | | TB | TC | | TE | TF | 0 | 1 | (53) | | TB | TC | | TE | | 0 | 0 |
| (22) | | TB | | TD | TE | TF | 0 | 1 | (54) | | TB | | TD | TE | | 0 | 0 |
| (23) | | | TC | TD | TE | TF | 0 | 1 | (55) | | | TC | TD | TE | | 0 | 0 |
| (24) | TA | TB | TC | TD | TE | TF | 0 | 1 | (56) | TA | TB | TC | TD | TE | | 0 | 0 |
| (25) | $\overline{TA}$ | $\overline{TB}$ | $\overline{TC}$ | $\overline{TD}$ | $\overline{TE}$ | $\overline{TF}$ | 0 | 1 | (57) | $\overline{TA}$ | $\overline{TB}$ | $\overline{TC}$ | $\overline{TD}$ | | TF | 0 | 0 |
| (26) | TA | TB | | | $\overline{TE}$ | $\overline{TF}$ | 0 | 1 | (58) | TA | TB | | | | TF | 0 | 0 |
| (27) | TA | | TC | | $\overline{TE}$ | $\overline{TF}$ | 0 | 1 | (59) | TA | | TC | | | TF | 0 | 0 |
| (28) | TA | | | TD | $\overline{TE}$ | $\overline{TF}$ | 0 | 1 | (60) | TA | | | TD | | TF | 0 | 0 |
| (29) | | TB | TC | | $\overline{TE}$ | $\overline{TF}$ | 0 | 1 | (61) | | TB | TC | | | TF | 0 | 0 |
| (30) | | TB | | TD | $\overline{TE}$ | $\overline{TF}$ | 0 | 1 | (62) | | TB | | TD | | TF | 0 | 0 |
| (31) | | | TC | TD | $\overline{TE}$ | $\overline{TF}$ | 0 | 1 | (63) | | | TC | TD | | TF | 0 | 0 |
| (32) | TA | TB | TC | TD | $\overline{TE}$ | $\overline{TF}$ | 0 | 1 | (64) | TA | TB | TC | TD | | TF | 0 | 0 |

NOTE: PRODUCE "1" at lead W; PRODUCE "0" at lead W.

The 32 combinations of toggle conditions, states 33 to 64 in the right-hand column of table 2 are all invalid, and comprise six one-sixth, 20 three-sixths and 6 five-sixths states. All these combinations individually result in either "1" or "0" being applied to both input leads T and U, and accordingly the "0" signal is generated at lead W extending from gate G17 of Exclusive-OR device E5.

Of the 32 combinations of toggle conditions states 1 to 32 in the left-hand column of table 2, 16 states, namely 15 two-sixths and 1 zero-sixths are valid whereas the remainder are invalid and comprise the six-sixths state together with all the four-sixths states. All the combinations (valid and invalid) of the left-hand column result in unlike conditions, "1" and "0," being applied to the input leads T and U of Exclusive-OR device E5. Accordingly the "1" signal is generated at the output lead W of the latter device and it is evident that steps must be taken to differentiate between the 16 valid and 16 invalid states.

Lead W together with leads X and Y constitute the input paths of the 3-input NAND gate GWXY which is required to produce "0," at the output lead OP of the monitoring circuit, only when all three inputs are "1;" the "0" output being indicative of any valid state two-sixths or zero-sixths of the toggles.

The condition of lead X is controlled by the circuit logic comprising gates G2, G8, G18, G4 and G19, whereas the condition of lead Y is controlled by the circuit logic comprising gates G5, G8, G20 and G21. Of the gates mentioned, G1, G2, G4, G5 and G8 are also incorporated in appropriate ones of Exclusive-OR devices E1, E2 and E3 so that the control of lead X and Y merely involves addition of four 2-input NAND gates.

By taking the output lead P ($\overline{AB}$) of gate G2 and the lead V ($\overline{EF}$) of gate G8 to individual inputs of gate G18, and combining the output lead of gate G18 and the output lead Q (C+D) of gate G4 at the gate G19, the output lead X of the latter may be interpreted as having the significance $\overline{[C+D]\,[AB+EF]}$. This means that any combination of set toggles comprising or including any of the nine groups in table 3A below will generate "0" at lead X; other combinations producing "1." By taking the output lead S ($\overline{CD}$) of gate G5 and the output lead V ($\overline{EF}$) of gate G8 to the individual inputs of gate G20, and combining the output lead of gate G20 and the output lead M (A+B) of gate G1 at the gate G21, the output lead Y of the latter may be interpreted as having the significance $\overline{[A+B]\,[CD+EF]}$. This means that any combinations of set toggles comprising or including any of the nine groups in table 3B below will generate "0" at lead Y; other combinations producing "1."

Table 3A

| | | | | | | |
|---|---|---|---|---|---|---|
| TA | TB | TC | ...... | ...... | ...... | |
| ...... | ...... | TC | ...... | TE | TF | |
| TA | TB | TC | ...... | TE | TF | |
| TA | TB | ...... | TD | ...... | ...... | |
| ...... | ...... | ...... | TD | TE | TF | X≡0 |
| TA | TB | ...... | TD | TE | TF | |
| TA | TB | TC | TD | ...... | ...... | |
| ...... | ...... | TC | TD | TE | TF | |
| TA | TB | TC | TD | TE | TF | |

Table 3B

| | | | | | | |
|---|---|---|---|---|---|---|
| TA | ...... | TC | TD | ...... | ...... | |
| TA | ...... | ...... | ...... | TE | TF | |
| TA | ...... | TC | TD | TE | TF | |
| ...... | TB | TC | TD | ...... | ...... | |
| ...... | TB | ...... | ...... | TE | TF | Y≡0 |
| ...... | TB | TC | TD | TE | TF | |
| TA | TB | TC | TD | ...... | ...... | |
| TA | TB | ...... | ...... | TE | TF | |
| TA | TB | TC | TD | TE | TF | |

Table 4, below, shows as extracted from the left-hand column of table 2, all the invalid combinations of toggles which, like the valid combinations, give rise to "1" at lead W. By correlating these 16 invalid states with appropriate ones of the 18 groups appearing in tables 3A and 3B the conditions of the X and Y leads for the various states are found to be as represented in table 4.

TABLE 4

| | Toggles set | | | | | | X | Y |
|---|---|---|---|---|---|---|---|---|
| (5) | TA | TB | TC | ...... | TE | ...... | 0 | 1 |
| (6) | TA | TB | ...... | TD | TE | ...... | 0 | 1 |
| (7) | TA | ...... | TC | TD | TE | ...... | 1 | 0 |
| (8) | ...... | TB | TC | TD | TE | ...... | 1 | 0 |
| (13) | TA | TB | TC | ...... | ...... | TF | 0 | 1 |
| (14) | TA | TB | ...... | TD | ...... | TF | 0 | 1 |
| (15) | TA | ...... | TC | TD | ...... | TF | 1 | 0 |
| (16) | ...... | TB | TC | TD | ...... | TF | 1 | 0 |
| (18) | TA | TB | ...... | ...... | TE | TF | 1 | 0 |
| (19) | TA | ...... | TC | ...... | TE | TF | 0 | 0 |
| (20) | TA | ...... | ...... | TD | TE | TF | 0 | 0 |
| (21) | ...... | TB | TC | ...... | TE | TF | 0 | 0 |
| (22) | ...... | TB | ...... | TD | TE | TF | 0 | 0 |
| (23) | ...... | ...... | TC | TD | TE | TF | 0 | 1 |
| (24) | TA | TB | TC | TD | TE | TF | 0 | 0 |
| (32) | TA | TB | TC | TD | ...... | ...... | 0 | 0 |

It follows that, in each of these invalid states, the gate GWXY is not satisfied since, even though lead W is at "1," at least one of leads X and Y is at "0." It can be deduced that only when any of the valid states (two-sixths and zero-sixths of the toggles is evident, are all of leads W, X and Y at "1" to cause GWXY to generate "0" at the output lead OP. Thus "1" at lead OP signifies an invalid state whereas "0" signifies a valid state.

Instead of monitoring the set and reset outputs of all six storage toggles or the like as shown in FIG. 1, it may be convenient to effect the monitoring function with respect to only six leads of the toggles. This requirement is met by replacing the Exclusive-OR devices E1, E2 and E3 of FIG. 1 by the Exclusive-OR devices E6, E7 and E8 respectively of FIG. 2. Devices E6, E7 and E8 are identical with devices E4 and E5, each comprising four 2-input NAND gates. Of the input leads, leads B, D and F extend from the set sides of toggles TB, TD and TF respectively whereas input lead $\overline{A}$, $\overline{C}$ and $\overline{E}$ extend from the reset sides of toggles TA, TC and TE respectively. The bracketted conductors M, N, P, Q, R, S, U and V are connected in a manner identical with the corresponding conductors of FIG. 1 to complete the modified monitoring circuit.

Taking Exclusive-OR device E6 by way of example its modes of operation are summarized below:

| | Input leads | | Gate outputs | | | |
|---|---|---|---|---|---|---|
| | $\overline{A}$ | B | G31 | G32 | G33 | G34 |
| (1) TA set TB reset | 0 | 0 | 1 | 1 | 1 | 0 |
| (2) TA reset TB set | 1 | 1 | 0 | 1 | 1 | 0 |
| (3) TA set TB set | 0 | 1 | 1 | 1 | 0 | 1 |
| (4) TA reset TB reset | 1 | 0 | 1 | 0 | 1 | 1 |

Thus, as in the case of device E1 of FIG. 1, the Exclusive-OR device E6 produces "0" at lead N when the toggles are in different conditions i.e. either 1 and 2 above, to give the lead the significance $\overline{A+B}$, whereas "1" is produced when the toggles are in identical conditions, i.e. either 3 and 4 above. Also as in the case of device E1, it can be deduced that "1" is only produced at lead M (output of gate G32) with toggle TA and/or TB set, i.e. with either of cases 1, 2 or 3 above obtaining; and accordingly lead M has the significance A+B. It can also be seen that "0" is produced at lead P, served by gate G33, when both toggles are set so that the lead bears the significance $\overline{AB}$.

It will now be appreciated that the various outputs of devices E6, E7 and E8 correspond to those of devices E1, E2 and E3, and it follows that the alternative circuit in its entirety will give the same results as that shown in FIG. 1.

The monitoring circuit shown in FIG. 3 is substantially the functional equivalent of that of FIG. 1 but NOR instead of NAND gates are used throughout, and the indications obtained at the output lead OP are the inverse of those obtained at the corresponding lead of FIG. 1. Accordingly in FIG. 3, "1" at lead OP signifies valid states (two-sixths and zero-sixths of toggles whereas invalid states are signified by "."

In FIG. 3, as inferred by the symbol "1" contained by the circle, each is satisfied by an input of the appropriate type at any or all input leads. When any or all inputs are "1" the inverted output "0" is obtained, whereas when all inputs of a gate are "0" the output is "1." The Exclusive-OR devices E1, E2, E3, E4 and E5 are connected, insofar as leads N, R, U, T and W are concerned, in the same manner as the corresponding devices in FIG. 1. It will be deduced that leads N, R and U now have the significance A⊕B, C⊕D and E⊕F respectively which implies, in the case of lead N typically, that "1" is only evident when toggle TA or TB exclusively is set. It also follows that the input conditions for Exclusive-OR device E5, which are derived from Exclusive-OR device E4 by way of lead T are the inverse of those given in table 2 above; the inputs extending to lead U of device E5 also being the opposite of those shown in that table. The outcome is that each of the 32 combinations of toggle conditions in the right-hand column (all invalid and comprising the one-sixth, three-sixths and five-sixths states) of table 2 produce "1" at lead W, whereas each of the left-hand column combinations (16 valid and 16 ) produce "0" at lead W. Thus the signals at lead W are inverted with respect to the corresponding lead of FIG. 1.

In FIG. 3 as in the case of FIG. 1 use is made of by-products of Exclusive-OR devices E1, E2 and E3, although gate G7 makes a byproduct available over lead Z. Leads M, Q and Z bear the significance AB, CD and EF which infers that in each case "1" is evident only when both of the appropriate pair of toggles (TA/TB, $\overline{TC/TD}$, $\overline{TE/TF}$.) are set. Leads P and S have the significance $\overline{A+B}$ and $\overline{C+D}$ respectively to infer that "0" is evident only when either of each of the appropriate pair of toggles (TA/TB, TC/TD) is set.

Continuing with FIG. 3, leads M and Z serve the NOR gate G18, which has its output lead, like lead S, extending to gate G19. The output of the latter extends over lead X, bearing the significance [C+D] [AB+EF], to an individual input of gate GWXY.

Leads Q and Z serve gate G20, and gate G21 is controlled from the output of gate G20 and from lead P. The output of gate G21 extends over lead Y, bearing the significance [A+B] [CD+EFB], to the third input of gate GWXY.

As regards lead X and its attendant circuitry, it can be deduced that the combination of set toggles set forth in table 3A above will now produce "1" at that lead; other combinations producing "0." On the other hand, the combinations set forth in table 3B will produce "1" at lead Y; other combinations producing "0."

Accordingly in using FIG. 3 it will now be apparent that "0" is only generated at each of leads W, X and Y when a valid state (two-sixths or zero-sixths) of the toggles is encountered, "1" being generated at least one of the leads for any invalid state. Therefore the gate GWXY produces "1" at output lead OP for valid states and "0" for invalid states.

In those cases where it is required to effect the monitoring of the toggles over six leads (as in FIG. 2) the Exclusive-OR devices E1, E2 and E3 of FIG. 3 may be replaced by devices such as E4 or E5 which incorporate four 2-input NOR gates.

What we claim is:

1. A monitoring circuit operative according to the collective state of six storage toggles or the like each capable of assuming a first condition and a second condition and arranged in first, second and third mutually exclusive pairs, comprising first, second and third Exclusive-OR devices each having an output lead and each controlled by said first, second and third pairs of toggles, respectively, to produce a particular signal at its respective output lead only when either of the related toggles is in the first condition; fourth and fifth Exclusive-OR devices each having two input leads and an output lead, said fourth device being controlled by outputs of said first and second Exclusive-OR devices, said fifth device being controlled from the outputs of said third and fourth devices, said fifth device being arranged to produce a signal of one form at its output lead if an odd number of storage toggles are in said first condition and to produce a signal of the alternative form for all other combinations of conditions of the toggles; and first and second circuit means having individual output leads separately controlled by all the toggles for producing a signal corresponding to said alternative form at both of said first and second circuit means output leads only in response to those of said other combinations of conditions wherein solely two of said toggles or none of them are in said first condition.

2. A monitoring circuit as recited in claim 1, including output gating means connected to the output leads of said fifth Exclusive-OR device and said first and second circuit means for generating a significant signal when a signal corresponding to said alternative form is received by said outout gating means from each of said fifth Exclusive-OR device and said first and second circuit means, whereby said significant signal indicates that any two of said toggles or none of them are in said first condition.

3. A monitoring circuit as recited in claim 2, wherein said Exclusive-OR devices and said first and second circuit means are comprised exclusively of 2-input NAND gates.

4. A monitoring circuit as recited in claim 2, wherein said Exclusive-OR devices and said first and second circuit means are comprised exclusively of 2-input NOR gates.